United States Patent [19]

Sengupta et al.

[11] Patent Number: 6,063,719

[45] Date of Patent: May 16, 2000

[54] CERAMIC FERRITE/FERROELECTRIC COMPOSITE MATERIAL

[75] Inventors: Louise C. Sengupta; Somnath Sengupta, both of Warwick, Md.

[73] Assignee: The United States of America as represented by the Secretary of the Army, Washington, D.C.

[21] Appl. No.: 09/144,982

[22] Filed: Sep. 1, 1998

Related U.S. Application Data

[60] Provisional application No. 60/059,996, Sep. 4, 1997.

[51] Int. Cl.[7] .......................... C04B 35/26; C04B 35/468; C04B 35/47
[52] U.S. Cl. ...................... 501/137; 501/139; 252/62.63; 252/62.64; 252/62.9 PZ
[58] Field of Search .................................. 501/137, 139; 252/62.64, 62.63, 62.9 PZ

[56] References Cited

U.S. PATENT DOCUMENTS

| | | | |
|---|---|---|---|
| 5,190,842 | 3/1993 | Saha et al. | 252/62.63 |
| 5,427,988 | 6/1995 | Sengupta et al. | 501/137 |
| 5,512,196 | 4/1996 | Mantese et al. | 501/137 |
| 5,601,748 | 2/1997 | Mansour et al. | 501/137 |
| 5,856,770 | 1/1999 | Mantese et al. | 252/62.5 |

OTHER PUBLICATIONS

Evaluation of Ferroelectric/Ferromagnetic Composite By Micro–Composite Designing, T. Yamamoto, M. Chino and R. Tanaka, Department of Electrical Eng., National Defense Academy, Yokosuka, 239 Japan (1989).

Applicability of Effective medium Theory to Ferroelectric/Ferromagnetic Composites with Composition and Frequency–Dependent Complex Permittivities and Permeabilities., Joseph V. Mantese, Adolph L. Micheli, and Dennis F. Dungan, General Motors Research and Development Laboratories, Electrical and Electronics Department, 1996 American Institute of Physic S0021–8979(96)07303–X.

*Primary Examiner*—Karl Group
*Attorney, Agent, or Firm*—Paul S. Clohan, Jr.; U. John Biffoni

[57] ABSTRACT

A novel ceramic ferrite/ferroelectric composite material having a low dissipation factor, voltage tunability, and proper impedance matching for the incident medium. The material comprises ferrites doped with the ferroelectric Barium Strontium Titanate (BSTO) or ferrites doped with the ferroelectric Barium Strontium Titanate (BSTO)/MgO. Preferred composites are magnesium ferrites doped with BSTO and magnesium ferrites doped with BSTO/MgO. Most particularly, the inventive composites are comprised of magnesium ferrites doped with $Ba_{1-x}Sr_xTiO_3$ and magnesium ferrites doped with $Ba_{1-x}Sr_xTiO_3$/MgO, wherein x is greater than 0.00, but less than or equal to 0.75, and wherein the percent weight ratio of magnesium ferrite to BSTO or BSTO/MgO is 60 to 95 percent ferrite to 40 to 5 percent BSTO or 60 to 95 percent ferrite to 40 to 5 percent BSTO/MgO ferroelectric. A particularly well suited composite, i.e., one having a $\mu/\in$ ratio close to unity, comprises 80 weight percent magnesium ferrite and 20 weight percent BSTO/MgO, wherein said BSTO/MgO comprises 80 weight percent $Ba_{0.6}Sr_{0.4}TiO_3$ combined with 20 weight percent MgO.

12 Claims, No Drawings

CERAMIC FERRITE/FERROELECTRIC COMPOSITE MATERIAL

This patent application is a nonprovisional continuation of provisional application Ser. No. 06/059,996, filed on Sep. 4, 1997.

GOVERNMENT INTEREST

The invention described herein may be manufactured, used and/or licensed by or for the United States Government.

FIELD OF THE INVENTION

The present invention pertains generally to ceramic composites whose dielectric and magnetic properties may be adjusted by varying the formulation of the composite constituents. More particularly, the present invention is directed to ceramic ferrite/ferroelectric composites having low dissipation factor, voltage tunability, and proper impedance matching to the incident medium. Most particularly, the invention pertains to novel materials comprising composites of magnesium ferrite materials combined with the ferroelectric ceramic Barium Strontium Titanium Oxide (Barium Strontium Titanate), $Ba_{1-x}Sr_xTiO_3$ ($BaTiO_3$—$SrTiO_3$) referred to herein as BSTO; and composites of magnesium ferrite materials combined with the ferroelectric ceramic composite Barium Strontium Titanate/Magnesium Oxide (BSTO/MgO).

BACKGROUND OF THE INVENTION

The need exists for the fabrication of ceramic materials having improved electronic and magnetic properties which may be adjusted for a particular intended use. The present invention pertains to novel low electronic loss, voltage tunable ceramic materials exhibiting "adjustable" dielectric and magnetic properties. As used herein, the term "adjustable" means that a wide range of dielectric and magnetic properties can be attained by varying the amounts of the constituents of the composite. Hereafter, for the purpose of brevity, this type of material will be referred to as $\mu/\in$ material, where $\mu$ refers to the magnetic property permeability, and $\in$ refers to the electronic property permittivity.

The fabrication and use of BSTO and BSTO/MgO is known and has been practiced on previous occasions. BSTO has been known to be used for its high dielectric constant (ranging approximately from 200 to 6,000) in various antenna applications. This is set forth in the publication "Planar Microwave Electro-Optic Phase Shifters," *Microwave Journal*, Volume 35(6), (June 1992), by Richard W. Babbitt et al., which concluded that a need existed for materials having more desirable electronic properties.

To address this need, BSTO has been combined with additives such as MgO, thereby providing a ceramic ferroelectric composite material BSTO—MgO possessing superior electronic properties for use in antenna systems at both microwave and millimeter wave range frequencies. See, for example, U.S. Pat. No. 5,427,988, hereby incorporated by reference herein.

The dielectric properties of materials are evaluated through the measurement of the dielectric constant or relative permittivity ($\in_r$), tunability (T), and dissipation factor or loss tangent (tan $\delta$). The magnetic properties of materials are measured at the same frequency range by measuring the relative permeability ($\in_r$).

Tunability may be defined as (dielectric constant with no applied voltage-dielectric constant with an applied voltage)/(dielectric constant with no applied voltage). For simplicity purposes, tunability can be represented as T $$T=(X-Y)/X$$

wherein,

X=(dielectric constant with no applied voltage); and
Y=(dielectric constant with an applied voltage).

The tunability of a material can range from 1–60% depending upon the composition of the materials employed.

Dielectric constant is related to the energy storage in the material; whereas, the loss tangent is related to the power dissipation in the same material. In general, the dielectric function is a complex quantity with $\in = \in' - i\in''$; and the loss tangent, tan $\delta = \in''/\in'$.

Permeability ($\mu$) is a property of materials modifying the action of magnetic poles placed therein and modifying the magnetic induction resulting when the material is subjected to a magnetic field or magnetizing force. The permeability $\mu$ of a substance may be defined as the ratio of the magnetic induction in the substance to the magnetizing field to which it is subjected. The permeability of a vacuum is unity.

Although the fabrication of $\mu/\in$ materials has been practiced in the past, the common application for such materials has been in absorbing (or reflecting) incident microwave energy in order to reduce electromagnetic interference. In such applications, a high dissipation factor is desired. For example, see both T. Yamamoto et al. in their publication, "Evaluation of ferroelectric/ferromagnetic composite by microcomposite designing," *Ferroelectrics* 95, 175 (1989); and J. V. Mantese et al. in their publication, "Application of effective medium theory to ferroelectric/ferrimagnetic composites with composition and frequency-dependent complex permittivities and permeabilities," *J. Appl. Phys.* 79 (3), (Feb. 1, 1996).

However, in applications where the microwave signal has to be launched into the active material through proper impedance matching with the incident medium, a high dissipation factor is not desirable. It is well known that the velocity of propagation of a microwave signal through a medium is dictated by the square root of the product of $\mu$ (permeability) and $\in$ (permittivity). The greater the value of the product, the slower is the velocity of propagation of the wave through the medium. Moreover, the closer the ratio of $\mu$ to $\in$ is to unity, the better the impedance matching of the circuit.

In current antenna designs, air is the dielectric medium and impedance matching is not easily achieved. However, by introducing the novel material of the present invention, comprising a ferrite/ferroelectric composite with matching permeability $\mu$ and permittivity $\in$, one can design an antenna with not only a reduced path length, but where the incident energy can be introduced into the antenna with better impedance matching. Thus, this reduces the amount of energy lost or dissipated by reflection.

The present invention provides for improved materials having electronic and magnetic properties adjustable for use, for example, the invention is designed to provide a material suitable to create an impedance matching circuit in antenna applications. This material is particularly well suited to applications such as airborne antennas where impedance matching is required in order to miniaturize the apparatus. The present invention provides the advantage of a low dissipation factor (tan $\delta$) in that the overall electronic loss of the composite is similar to the electronic loss of the ferroelectric constituent of the composite.

SUMMARY OF THE INVENTION

It is therefore an object of the present invention to provide a new class of voltage tunable, low electronic loss, ferrite/ferroelectric composites.

It is a further object of the present invention to provide ferrite/ferroelectric composites, referred to as $\mu/\in$ materials, which have a range of dielectric and magnetic properties which may be adjusted by varying the constituents of the composite.

It is a further object of the invention to provide ferrite/ferroelectric composite materials having a permeability ($\mu$) to permittivity ($\in$) ratio approaching unity to provide better impedance matching for antenna circuits and thereby miniaturizing the apparatus.

It is a further object of the invention that while the $\mu/\in$ ratio of the composite material is maintained relatively close to unity, the dissipation factor of the composite material is also maintained close to that of the ferroelectric constituent of the composite (typical tan δ of these ferroelectric composites is less than 0.01 in the specified frequency range of up to about 1 MHz).

It is a further object of the invention to provide a new class of $\mu/\in$ materials comprising magnesium ferrites doped with about 5–30 wt % BSTO ferroelectric composites, and magnesium ferrites doped with about 10–40 wt % BSTO/MgO ferroelectric composites.

It is a further object of the invention to provide a method of making the novel $\mu/\in$ materials of the present invention.

The present invention comprises a new class of composites comprising magnesium ferrites doped with BSTO or BSTO/MgO ferroelectric composites such that the ratio of permeability ($\mu$) to permittivity ($\in$) ($\mu/\in$) approaches unity, with values of $\mu/\in$ between about 20 and 100 being acceptable; and with the new composite having a dissipation factor of less than 0.01 in the low frequency range of up to about 1 MHz.

Other features and advantages of the present inventive composite materials, and the means to achieve these and other objectives of the present invention, will become apparent from the following detailed Description of the Preferred Embodiments and the appended Claims.

DESCRIPTION OF THE PREFERRED EMBODIMENTS

The present invention encompasses novel ceramic composite materials having adjustable electronic properties (dielectric or permittivity) and magnetic properties (permeability). These materials are superior to other currently employed $\mu/\in$ materials in that proper impedance matching is provided for antenna applications.

When one considers the optimization of the magnetic and electronic properties of $\mu/\in$ materials, the following parameters must be taken into consideration:

(1) Dielectric Constant or permittivity ($\in_r$): Ideally the dielectric constant should be low. As insertion loss (loss of energy getting into the ceramic) does not depend on the dielectric constant, it is not effected by lowering the dielectric constant. Also, since the loss tangent (tan δ) increases with increasing dielectric constant (for ferroelectric materials), lower dielectric constant materials tend to have lower loss tangents and therefore, less insertion loss.

(2) Low Loss: The dissipation factor or loss tangent (tan δ) which is intrinsic to the material serves to dissipate or absorb the incident energy and therefore is most effective for these materials when the loss tangent is in the range of 0.01 or less. The low loss tangent serves to decrease the insertion loss. Operating frequencies are controlled by the loss tangent.

(3) High Tunability: The tunability (T) of a particular material effects the material's electronic properties by how much the dielectric constant changes with applied voltage. The amount of phase shifting ability in antennas is directly related to the tunability, therefore, higher tunabilities are desired. The insertion loss is inversely related to the tunability so that the larger the tunability, the smaller the insertion loss. Optimum electronic properties would have tunabilities ranging from 7 to 36% (depending upon other factors, dielectric constant and loss tangent).

(4) Permeability ($\mu_r$): Magnetic permeability ($\mu$) is a property of materials modifying the action of magnetic poles placed therein and modifying the magnetic induction resulting when the material is subjected to a magnetic field or magnetizing force. The permeability $\mu$ of a substance may be defined as the ratio of the magnetic induction in the substance to the magnetizing field to which it is subjected. The permeability of a vacuum is unity.

The composite materials within the scope of the present invention comprise ferrites, most preferably magnesium ferrite, doped with ferroelectric composite Barium Strontium Titanate (BSTO), preferably $Ba_{1-x}Sr_xTiO_3$ wherein x is greater than 0.0 but less than or equal to 0.75, more preferably wherein x=0.35 to 0.40, and most preferably wherein x=0.40, that is, $Ba_{0.6}Sr_{0.4}TiO_3$. The materials within the scope of the present invention also comprise magnesium ferrites doped with the ceramic ferroelectric composite Barium Strontium Titanate/Magnesium Oxide (BSTO/MgO), preferably $Ba_{1-x}Sr_xTiO_3$ wherein x is greater than 0.0 but less than or equal to 0.75, more preferably wherein x=0.35 to 0.40, and most preferably wherein x=0.40, that is, $Ba_{0.6}Sr_{0.4}TiO_3$; and wherein the weight ratio of the BSTO to the MgO ranges from approximately 99–40% BSTO to approximately 1–60% MgO.

The magnesium ferrites were obtained from Trans-Tech, Inc., 5520 Adamstown Road, Adamstown, Md., 21710. Three different magnesium ferrites were used to produce the ferrite/ferroelectric composites of present invention. The stock numbers of the magnesium ferrites used were TT1-105, TT1-1000, and TT1-2650. Although the exact composition of these magnesium ferrites is proprietary to Trans-Tech, Inc., it is known that they comprise the fundamental magnesium ferrite, $MgFe_2O_4$, doped with aluminum to alter the material's magnetic properties. Physical properties of the magnesium ferrite materials are available in Trans-Tech catalogs.

Three different sets of ferrite/ferroelectric materials were prepared for evaluation. Set one samples were prepared using TT1-105, set two samples were prepared using TT1-1000, and set three samples were prepared using TT1-2605, each of said ferrites being doped with BSTO and BSTO/MgO in the range from 5 to 40 weight percent BSTO or BSTO/MgO. Powder forms of BSTO and BSTO/MgO were prepared in Army laboratories. These sets of materials were prepared by stoichiometrically mixing the constituents in a slurry of 200 proof ethanol and ball-milling overnight using 3/16 inch grinding media. A binder media comprising Rhoplex B-60A (Rhom and Haas Co., Philadelphia, Pa.), which is a 3 wt % organic binder consisting of an aqueous emulsion of acrylic polymer, was then added to the slurry and the mixture was further ball-milled. The mixture was subsequently air dried, pressed into pellets and sintered according to the sintering schedule of the ferrites provided by Transtech, Inc.

The sintering schedules were as follows. For the TT1-105 class of materials, the samples were ramped up at a 50 degree/hour rate to 500° C. and then at a 100 degree/hour rate to the final firing temperature of 1310° C. The soak time was 30 hours, after which the samples were cooled at a ramp down rate of 125 degrees/hour to 400° C., and then at a ramp down of 50 degrees/hour to room temperature. For the TT1-1000 and TT1-2650 class of materials, the ramp rates and firing temperatures were the same, however, the soak times were 10 hours for both classes as opposed to 30 hours for the TT1-105 materials.

Following the densification, the ceramic pellets were metallized by screen printing silver electrodes on them, i.e., carried out by Ferro Corp. 2226 silver end termination ink fired at 760 degrees C. and screen printed through a silk screen. A Hewlett Packard 4194A impedance gain analyzer was then used to measure the dielectric constant and the tunability as a function of frequency. Measurements were taken at frequencies of 500 kHz and 1 MHz. Permeability measurements were then taken for the pellets by machining them into toroidal shapes and using a Hewlett Packard 4275A LCR meter to make the magnetic measurements.

Examples of the ferrite/ferroelectric composites produced, and their measured electronic and magnetic properties are provided in the tables set forth below. In the tables, BSTO represents $Ba_{0.6}Sr_{0.4}TiO_3$; and BSTO/MgO represents $Ba_{0.6}Sr_{0.4}TiO_3$/MgO with the weight percentage of MgO as given in the table.

TABLE 1

| Sample Name | Sample Composition |
| --- | --- |
| TT1-105.0 | Undoped TT1-105 |
| TT1-105.1 | 95 wt % TT1-105 + 5 wt % BSTO |
| TT1-105.2 | 90 wt % TT1-105 + 10 wt % BSTO/MgO (20 wt % MgO) |
| TT1-105.3 | 90 wt % TT1-105 + 10 wt % BSTO |
| TT1-105.4 | 80 wt % TT1-105 + 20 wt % BSTO/MgO (20 wt % MgO) |
| TT1-1000.0 | Undoped TT1-1000 |
| TT1-1000.1 | 70 wt % TT1-1000 + 30 wt % BSTO |
| TT1-1000.2 | 60 wt % TT1-1000 + 40 wt % BSTO/MgO (60 wt % MgO) |
| TT1-1000.3 | 75 wt % TT1-1000 + 25 wt % BSTO |
| TT1-1000.4 | 75 wt % TT1-1000 + 25 wt % BSTO/MgO (20 wt % MgO) |
| TT1-2650.0 | Undoped TT1-2650 |
| TT1-2650.1 | 80 wt % TT1-2650 + 20 wt % BSTO |
| TT1-2650.2 | 70 wt % TT1-2650 + 30 wt % BSTO/MgO (20 wt % MgO) |
| TT1-2650.3 | 75 wt % TT1-2650 + 25 wt % BSTO |

TABLE 2

FREQUENCY = 500 kHz

| SAMPLE | PERMITTIVITY ($\epsilon_r$) | PERMEABILITY ($\mu_r$) | DISSIPATION FACTOR (tan δ) |
| --- | --- | --- | --- |
| TT1-105.0 | 28.59 | 55.0 | 0.004 |
| TT1-105.1 | 28.07 | 102.0 | 0.005 |
| TT1-105.2 | 29.05 | 86.0 | 0.004 |
| TT1-105.3 | 34.79 | 75.3 | 0.004 |
| TT1-105.4 | 45.75 | 42.6 | 0.004 |
| TT1-1000.0 | 30.02 | 93.0 | 0.012 |
| TT1-1000.1 | 130.97 | 13.0 | 0.003 |
| TT1-1000.2 | 135.71 | 14.0 | 0.005 |
| TT1-1000.3 | 96.46 | 13.8 | 0.004 |
| TT1-1000.4 | 76.92 | 22.0 | 0.005 |
| TT1-2650.0 | 31.24 | 85.0 | 0.03 |
| TT1-2650.1 | 70.76 | 24.0 | 0.01 |
| TT1-2650.2 | 85.61 | 31.0 | 0.009 |
| TT1-2650.3 | 95.90 | — | 0.01 |

TABLE 3

FREQUENCY = 1.0 MHz

| SAMPLE | PERMITTIVITY ($\epsilon_r$) | PERMEABILITY ($\mu_r$) | DISSIPATION FACTOR (tan δ) |
| --- | --- | --- | --- |
| TT1-105.0 | 28.55 | 55.0 | 0.004 |
| TT1-105.1 | 28.03 | 103.0 | 0.004 |
| TT1-105.2 | 29.05 | 87.0 | 0.003 |
| TT1-105.3 | 34.72 | 75.8 | 0.003 |
| TT1-105.4 | 45.65 | 42.8 | 0.004 |
| TT1-1000.0 | 29.90 | 93.0 | 0.009 |
| TT1-1000.1 | 130.79 | 13.0 | 0.003 |
| TT1-1000.2 | 135.39 | 14.0 | 0.005 |
| TT1-1000.3 | 94.63 | 13.8 | 0.003 |
| TT1-1000.4 | 76.76 | 21.9 | 0.004 |
| TT1-2650.0 | 31.06 | 85.0 | 0.02 |
| TT1-2650.1 | 70.47 | 25.0 | 0.009 |
| TT1-2650.2 | 85.33 | 31.0 | 0.008 |
| TT1-2650.3 | 95.52 | — | 0.009 |

This disclosure thus provides a new class of voltage tunable, low loss, ferrite/ferroelectric ceramic composites and a method of making the same. Since the permittivity ($\epsilon_r$) values of the BSTO and BSTO/MgO composites can be varies between about 3000 and 100, it is safe to say that the absolute values of the permittivity and the permeability of the $\mu/\epsilon$ materials will be dictated by the availability of high permeability $\mu$ ferrites. From the Tables it can be seen that sample TT1-105.4 has a $\mu/\epsilon$ ratio of approximately 0.95 with a dissipation factor of 0.004 at both 500 kHz and 1.0 MHz frequencies. The ceramic fabrication process described herein may also be adapted by persons of ordinary skill in the art to fabricate thick tapes of the same material.

While the particular preferred embodiments of the present invention have been shown and described, it will be obvious to those skilled in the art that changes and modifications may be made without departing from the spirit and scope of the invention. It is, therefore, intended that the claims herein include all such obvious changes and modifications as fall within the true spirit and scope of this invention.

What is claimed is:

1. A ceramic ferrite/ferroelectric composite material, consisting essentially of:

a magnesium ferrite material doped with Barium Strontium Titanate, said Barium Strontium Titanate represented as $Ba_{1-x}Sr_xTiO_3$, wherein x is greater than 0.0 but less than or equal to 0.75; and wherein said ferrite and said Barium Strontium Titanate are present in weight ratios of approximately 70%–95% magnesium ferrite to approximately 30%–5% Barium Strontium Titanate.

2. The ceramic ferrite/ferroelectric composite material of claim 1, wherein said Barium Strontium Titanate is $Ba_{1-x}Sr_xTiO_3$ and x=0.35 to 0.40.

3. The ceramic ferrite/ferroelectric composite material of claim 1, wherein said Barium Strontium Titanate is $Ba_{1-x}Sr_xTiO_3$ and x=0.40.

4. A ceramic ferrite/ferroelectric composite material, consisting essentially of:

a magnesium ferrite material doped with Barium Strontium Titanate/MgO, said Barium Strontium Titanate/MgO represented as $Ba_{1-x}Sr_xTiO_3$/MgO, wherein x is greater than 0.0 but less than or equal to 0.75 and wherein the weight ratio of said Barium Strontium Titanate to MgO ranges from approximately 40% to 80% Barium Strontium Titanate to approximately 60% to 20% MgO; and wherein said ferrite and said Barium Strontium Titanate/MgO are present in weight ratios of approximately 60% to 90% magnesium ferrite to approximately 40% to 10% Barium Strontium Titanate/MgO.

5. The ceramic ferrite/ferroelectric composite material of claim 4, wherein said Barium Strontium Titanate/MgO is $Ba_{1-x}Sr_xTiO_3$/MgO and x=0.35 to 0.40.

6. The ceramic ferrite/ferroelectric composite material of claim 4, wherein said Barium Strontium Titanate/MgO is $Ba_{1-x}Sr_xTiO_3$/MgO and x=0.40.

7. The ceramic ferrite/ferroelectric composite material of 4, wherein said composite material comprises about 80 weight percent magnesium ferrite and about 20 weight percent Barium Strontium Titanate/MgO, and wherein said Barium Strontium Titanate/MgO comprises about 80 weight percent Barium Strontium Titanate and about 20 weight percent MgO.

8. The ceramic ferrite/ferroelectric composite material of claim 1, wherein said magnesium ferrite has a permittivity between about 28 and 32 at both 500 kHz and 1.0 MHz frequencies, and a permeability between about 55 and 93 at both 500 kHz and 1.0 MHz frequencies.

9. The ceramic ferrite/ferroelectric composite material of claim 4, wherein said magnesium ferrite has a permittivity between about 28 and 32 at both 500 kHz and 1.0 MHz frequencies, and a permeability between about 55 and 93 at both 500 kHz and 1.0 MHz frequencies.

10. The ceramic ferrite/ferroelectric composite material of claim 7, wherein said composite material comprises 80 weight percent magnesium ferrite and 20 weight percent Barium Strontium Titanate/MgO, and wherein said Barium Strontium Titanate/MgO comprises 80 weight percent Barium Strontium Titanate and 20 weight percent MgO.

11. The ceramic ferrite/ferroelectric composite material of claim 7, wherein said composite material has a permeability to permittivity ratio ($\mu/\in$) of about 0.95 at both 500 kHz and 1.0 MHz frequencies.

12. The ceramic ferrite/ferroelectric composite material of claim 11, wherein said material has a dissipation factor of about 0.004 at both 500 kHz and 1.0 MHz frequencies.

* * * * *